United States Patent Office
3,483,531
Patented Dec. 9, 1969

3,483,531 PROCESS FOR THE RECORDING, REPRODUCING AND ERASING OF INFORMATION DATA ON RECORDING CARRIERS

André Etienne de Rudnay, Chateau de Valency, 1000 Lausanne, Switzerland

No Drawing. Filed Oct. 13, 1965, Ser. No. 495,677
Int. Cl. G11b *9/00;* G01d *15/10, 9/00*
U.S. Cl. 340—173 18 Claims

ABSTRACT OF THE DISCLOSURE

A process for transducing informational data utilizing a recorder carrier consisting of a solid body member having a surface of an inorganic material capable of absorbing and expelling a gaseous constituent when subjected to heat, i.e., Ag, Ce, Cu, Mn, Mo, Nb, Ta, Ti, W, Zr, etc. The surface of the carrier is exposed to a gaseous constituent of nitrogen, or halogen gas and locally activated by radiant energy in accordance with the elements of informational data to be recorded to produce a differential chemical structure at the localized region of such surfaces. Erasing is carried out by treating the surface to restore the chemical structure thereof in respect to the gaseous constituent of the surface prior to activation and reproduction of the informational data is carried out by an optical or electron-optical scanning of the regions to retrieve the stored information.

The present invention relates to a process for the recording (writing) of information data on recording carriers and reproducing (reading) as well as possibly erasing information data therefrom, in particular, recording carriers in the form of plates, for example of card formation or in the form of strips. As information data which are to be written on the recording carrier there come into consideration both so-called analog information data, such as, for example, speech and music recordings, analog measurement values, modulation signals, etc., and also, and this preferably, so-called digital information data in which, therefore, there are recorded exclusively yes-no signals (bits). In partacular, the process and recording carrier therefor according to the invention is suitable for the purpose of recording and reproducing information data with an extremely high writing density, and with the least amount of crosstalk, that is, with avoidance of mutual influencing of individual tracks adjacent to one another, for example, separate tracks.

The process for the recording, reproducing and erasing of information data according to the invention is characterized by the utilization, as a recording carrier, of an inorganic solid body or an inorganic solid thin layer, whose surface, for the recording and/or erasing, is exposed to the action of reactive gases, and more particularly, in the recording, with localized activation of the surface in correspondence to the information to be recorded, in which process the recording carrier, for the reading of the information, is utilized as a part of an optical or electron-optical system employing a closely bundled light or electron beam.

In the process according to the invention, therefore, an inorganic solid body is altered in its nature at least at its surface, possibly in a very thin layer, at desired places by a reversible reaction with a gas, in corespondence to the information to be recorded. This alteration of the nature of the material is so lasting, that the information data can be repeated as often as desired until the information items are again erased by a subsequent reaction process.

The process of the invention is based on the following insights and considerations:

Even extremely small amounts of a gas absorbed or otherwise taken up by an inorganic surface or thin layer lead in many cases to changes which can be detected with physical measuring methods, in particular, optical methods. Thus, for example, the reflective capacity of titanium and many other metals absorbing hydrogen falls after absorption of very small amounts of hydrogen and the other optical properties are likewise altered. As soon, however, as the hydrogen is again expelled by heating, the metal recovers its original optical properties. If this reversible chemical reaction is carried out on many small surfaces or thin layers, or on parts of a larger surface or thin layer, there results the possibility of always easable recording information data in accordance with the invention. This process can be carried out, further more, not through expulsion or evaporating-off of an absorbed gas, but also by direct evaporation of the resulting reaction products.

An essential advantage of the process according to the invention lies in the simple means with which a rapid recording, reproducing and erasing of information data is made possible, which accomplish the recording and erasing by simple change of temperature. If, for example, palladium, platinum, tantalum, titanium, zirconium, etc., is heated in the presence of hydrogen or hydrogen gas residues, or molybdenum, tungsten, etc., is heated in the presence of atomic nitrogen then there is reached in each case, a temperature at which the metal readily absorbs gases. On further increasing of the temperature, the gas is again given off, so that the earlier chemical state is produced or at least approximately reached. Ordinarily in the degassing the reactive gas is pumped off so that on cooling of the metal it is not again absorbed thereby. As the inorganic surfaces or thin layers used according to the invention, upon being brought to degassing temperature, for example, by electron bombardment, cool very rapidly, they can reabsorb relatively little gas in the brief cooling time, and a withdrawal of the gases given off therefore, in many cases, is unnecessary. If subsequently the recording produced in this manner is to be erased by restoration of the original chemical state of the surface or thin layer, the carrier is then heated to greater temperature and tempered until the equilibrium, corresponding to the gas pressure and the temperature between the expelled and absorbed hydrogen, is gain restored. If the tempering takes place in the presence of ionized hydrogen, the inorganic thin layers used according to the invention, the thickness of which in most cases lies considerably under a ten-thousandth of a millimeter, again absorb a corresponding amount of hydrogen in a fraction of a second.

The process according to the invention will be described in detail with the aid of the following examples.

(1) The surface of a solid body, or a thin layer, consisting of a metal or compound reversibly absorbing hydrogen or another gas, such as, for example, palladium, platinum, titanium, zirconium, tantalum, niobium, TiZr, etc., while in the presence of the gas to be absorbed (such as, for example, hydrogen or traces of hydrogen), is brought, by means of a closely bundled beam of electromagnetic waves or charged particles, in the places to be inscribed, to that temperature which leads to a rapid absorption of the gas. Energy and diameter of the beam, and its duration can be varied at will, so that there occurs a gas-metal compound or solution of the gas in the metal, which is in places, of differing depth, width and chemical composition and, accordingly, is also characterized by different physical properties. The inscription thus obtained can be read with a similar closely bundled beam of electromagnetic waves, for example, monochromatic waves of the visible spectrum, and transformed into electrical signals, in which the differing depth, width and chemical composition yield a corresponding variation in the intensity of the reflected or passed measuring beam. The reading does not lead to any impairment of the incription, which can be read repeatedly. The erasing of the script takes place in the manner that by means of Joule heat, electron bombardment or in any other desired manner the entire writing surface, or with the aid of bundled beams the individual symbols are brought to a temperature which results in the expelling of a considerable portion of the absorbed gas. If, in special cases, a thorough expulsion is desired, an electric getter pump with reversible suction and gas supplying action can be used for absorption and supplying of the hydrogen.

(2) The process described in the first example is carried out in reverse, by first hydrogenating the surface or thin layer, or bringing into reaction with another reversibly absorbed gas and then, with the aid of a bundled beam, dehydrogenating it, i.e., inscribing it, in varying depth and/or width. The erasing of the writing is accomplished by a repetition of the hydrogenation.

(3) A metal oxide partially giving off its oxygen at high temperature, such as $TiO_2$, $CeO_2$, $MnO_2$, etc. is heated at desired places to the temperature at which the oxide, through loss of oxygen, is transformed into a lower modification. In order to erase the writing generated in this manner, the oxide is reoxidized at lowest temperature to superoxide.

(4) A metal-gas compound decomposing at high temperature, such as silver oxide or copper oxide is grown through action of bundled oxygen ions in the places to be inscribed on a surface or thin layer of silver or copper, the grown inscription is subsequently read and finally, through heating, caused to decompose.

(5) In this example the solid reaction product serving for the inscribing is to be evaporated off. Thus, for example, tantalum or another metal which forms volatile oxygen compounds at high temperature, is superficially oxidized in the plates to be inscribed and the $Ta_2O_5$ layer obtained is evaporated at elevated temperature, whereby the inscription is likewise erased.

The inscription cited in the examples is preferably executed in each case with bundled beams of electromagnetic, for example visible or infrared, waves, or charged particles, such as electrons and ions. Since the electromagnetic waves can be gathered into beam bundles whose diameter can be reduced to the order of magnitude of the wavelength, while beam bundles of charged particles can likewise be narrowed to a diameter of one or a few microns, the new process makes possible the recording, reading and erasing of inscriptions whose density lies considerably above that of the known processes.

A preferred execution of the new process provides for the use of interference systems which is described thoroughly in a separate patent application. According to this, the chemical nature of a surface or of a thin layer which forms a component of an optical interference system is varied reaction with reactive gases or ions of such gases and the variation of the optical properties, occurring by reason of this reaction, can be measured and used as writing and reading process. In this manner, in particular, very small changes of the chemical nature of an inorganic solid surface or thin layer can be measured, so that processes, such as, for example, hydrogenation and dehydrogenation, can be carried out very rapidly and without disadvantageous effect.

Although the reading of the recorded information data by optical means and especially in the optical interference method is in many cases preferred, in line with the invention, it is possible to use other devices as well and, in particular, to measure the variation of other, non-optical physical properties and utilize them for the reading, provided that the recording and erasing takes place in the new manner according to the invention. Thus, for example, the change that has occurred in consequence of the change of chemical state, of the thermoelectric, magneto-optical or other physical properties, can be measured by means of electron beams or light beams or in other desired manner, and evaluated as a reading.

Changes may be made within the scope and spirit of the appended claims which define what is believed to be new and desired to have protected by Letters Patent.

I claim:

1. A process of transducing informational data comprising (a) providing a solid body recording carrier member having a surface of an inorganic material capable of undergoing chemical changes in respect to a gaseous constituent when subjected to radiant energy, (b) exposing said surface to an atmosphere having a gaseous constituent, (c) producing radiant energy for impingement on localized regions of said surface, which radiant energy is selectively adjustable to reliably differentially condition selected localized regions of said body in relation to other intervening regions to be chemically changed in response to the information being recorded such that an alteration in chemical structure is produced in conjunction with the gaseous constituent at the selected localized reigons, and (d) controlling such adjustment of the radiant energy impinging on successive localized regions of said surface in accordance with elements of informational data to be recorded to produce differential chemical structures at the successive localized regions in accordance with such elements, said successive localized regions being ordered and arranged in a predetermined manner to enable systematic scanning thereof to retrieve said data.

2. The process as defined in claim 1, wherein the radiant energy for impingement on localized regions of the surface consists of beams of light, said light being selected from the group consisting essentially of infrared and visible light.

3. The process as defined in claim 1, wherein the radiant energy for impingement on localized regions of the surface consists of beams of charged particles.

4. The process as defined in claim 1, wherein the radiant energy for impingement on localized regions of the surface is controllably adjustable as to its effective cross-section in accordance with the elements of informational data.

5. The process as defined in claim 1, wherein the radiant energy for impingement on localized regions of the surface is controllably adjustable as to its energy content in accordance with the elements of informational data.

6. The process as defined in claim 1, wherein the radiant energy for impingement on localized regions of the surface is controllably adjustable as to its active duration on said localized regions in accordance with the elements of informational data.

7. The process as defined in claim 1, wherein erasing elements of informational data on the surface of the recording carrier consists of treating said surface to restore the chemical structure thereof in respect to the gaseous constituent of said surface prior to impingement by the radiant energy.

8. The process as defined in claim 7, wherein the treatment of the surface to restore the chemical structure thereof in respect to the gaseous constituent of said surface comprises heating said surface to expel any absorbed gaseous constituents from said surface.

9. The process as defined in claim 7, wherein the treatment of the surface to restore the chemical structure thereof in respect to the gaseous constituents of said surface comprises heating the surface in the presence of the gaseous constituents to absorb said constituents on said surface.

10. The process as defined in claim 1, wherein the inorganic material capable of undergoing chemical changes in respect to a gaseous constituent when subjected to radiant energy is selected from the group consisting essentially of Ag, Ce, Cu, Mn, Mo, Nb, Ta, Ti, W, Zr, and mixtures thereof.

11. The process as defined in claim 1, wherein the gaseous constituents are selected from the group consisting essentially of nitrogen, oxygen, hydrogen and halogen gaseous constituents.

12. The process as defined in claim 1, wherein the surface of the recording carrier member is composed of a material reversibly absorbing gaseous constituents selected from the group consisting essentially of nitrogen, oxygen, hydrogen and halogen gaseous constituents, said material being selected from the group consisting essentially of Ag, Ce, Cu, Mn, Mo, Nb, Ta, Ti, W, Zr, TiZr and mixtures thereof.

13. The process as defined in claim 1, wherein the surface of the recording carrier member is composed of a metal oxide capable of yielding a gaseous oxygen constituent at elevated temperatures, said surface being treated in accordance with the elements of informational data at the localized regions to drive the oxygen constituents from said regions to produce an altered chemical structure at said localized regions.

14. The process as defined in claim 13, wherein the metal oxide is selected from the group consisting essentially of $TiO_2$, $CeO_2$, $MnO_2$, $Ag_2O$, CuO, and $Ta_2O_5$.

15. The process as defined in claim 1, wherein reproducing the recorded informational data comprises systematically thermoelectrically scanning the successive regions of the surface of the recording carrier.

16. The process as defined in claim 1, wherein reproduction of the recorded informational data comprises systematically magnetically-optically scanning the successive regions of the surface of the recording carrier.

17. The process as defined in claim 1, wherein reproduction of the recorded informational data comprises systematically optically scanning the successive regions of the surface of the recording carrier.

18. The process as defined in claim 1, wherein reproduction of the recorded informational data comprises systematically electronically-optically scanning the successive regions of the surface of the recording carrier.

References Cited

UNITED STATES PATENTS

| | | | |
|---|---|---|---|
| 2,847,330 | 8/1958 | Toulmin | 117—212 |
| 3,140,143 | 7/1964 | Kaspaul | 340—173 |
| 3,423,740 | 1/1969 | Barrekette | 340—173 |

TERRELL W. FEARS, Primary Examiner

U.S. Cl. X.R.

346—1, 76

UNITED STATES PATENT OFFICE
CERTIFICATE OF CORRECTION

Patent No. 3,483,531 Dated December 9, 1969

Inventor(s) Andre Etienne de Rudnay

It is certified that error appears in the above-identified patent and that said Letters Patent are hereby corrected as shown below:

Col. 1, line 20, after "nitrogen" insert --oxygen, hydrogen,--;
line 44, change "partacular" to --particular--;
line 66, change "corespondence" to --correspondence--.

Col. 2, line 13, change "easable" to --erasable--;
line 44, change "gain" to --again--.

Col. 3, line 36, change "plates" to --places--.

Col. 4, line 20, change "reigons" to --regions--.

SIGNED AND SEALED
SEP 22 1970

(SEAL)
Attest:

Edward M. Fletcher, Jr.
Attesting Officer

WILLIAM E. SCHUYLER,
Commissioner of Paten